United States Patent

Hanrahan et al.

[11] Patent Number: 5,833,834
[45] Date of Patent: Nov. 10, 1998

[54] METHOD FOR GENERATING HYDROGEN FROM HBR

[75] Inventors: Robert J. Hanrahan, Gainesville, Fla.; Harley L. Heaton, Manassas, Va.; Robin Z. Parker, Miami, Fla.

[73] Assignee: Solar Reactor Technologies, Miami, Fla.

[21] Appl. No.: 835,233

[22] Filed: Apr. 7, 1997

Related U.S. Application Data

[60] Provisional application Nos. 60/014,958, Apr. 8, 1996 and 60/029,950, Nov. 8, 1996.

[51] Int. Cl.[6] .................................. C25B 1/02; C25B 1/04
[52] U.S. Cl. .................... 205/637; 205/619; 204/101; 204/157.48; 204/157.5; 210/748; 423/500; 429/19
[58] Field of Search ..................... 205/637, 619, 205/618; 204/101, 157.48, 157.5; 210/748, 664; 423/500; 429/19

[56] References Cited

U.S. PATENT DOCUMENTS

| | | | |
|---|---|---|---|
| 1,870,308 | 8/1932 | Behrman | 423/486 |
| 4,105,755 | 8/1978 | Darnell et al. | 204/128 |
| 4,288,301 | 9/1981 | Hart | 205/637 |
| 5,219,671 | 6/1993 | Parker et al. | 429/17 |
| 5,385,650 | 1/1995 | Howarth et al. | 205/619 |
| 5,411,641 | 5/1995 | Trainham, III et al. | 205/619 |

OTHER PUBLICATIONS

Gupta et al., Gas Phase Formation of Hydrogen Chloride by Thermal Chlorine–Steam Reaction, Int. J Hydrogen Energy, vol. 16, No. 10, 1991, pp. 677–682 no month available.

Noumann, Steuer u. Domke: Die Umsetzung von Brom mit Wasserdampf zu Bromwasserstoffsaure usw., 1926, pp. 374–375 no month available.

Zhumal Russkogo Fiziko–khimiches–kogo Obschchestva Pri Leningradskom Universitete (Section de Chimie), 59, 851 (1927) no month available.

I.M. Kolthoffl Recuil des Travaus chimiques des Pays–Bas., The Composition of an Aqueous Bromine and Bromic Acid Solution by Charcoal, 48, 291 (1929) no month available.

Darnell et al., Production of Hydrogen from Renewable Resources, Dec. 1983, pp. iii–V–Vii and 1–70.

Primary Examiner—Kathryn L. Gorgos
Assistant Examiner—Kishor Mayekar
Attorney, Agent, or Firm—IP Group of Pillsbury Madison & Sutro LLP

[57] ABSTRACT

An electrolysis cell, fuel cell and solar reactor or conventional furnace are operated in conjunction with one another for providing hydrogen as a product, from electrolysis of hydrogen bromide.

6 Claims, 7 Drawing Sheets

METHOD FOR GENERATING HYDROGEN FROM HBR

REFERENCE TO RELATED APPLICATIONS

This is based, in part, on subject matter disclosed in U.S. provisional patent application No. 60/014,958, filed Apr. 8, 1996, and U.S. provisional patent application No. 60/029,950, filed Nov. 8, 1996.

BACKGROUND OF THE INVENTION

U.S. Pat. No. 5,219,671, R. Z. Parker, R. J. Hanrahan and A. K. Gupta, issued Jun. 15, 1993 discloses a method of utility load-leveling based on electrolysis of hydrogen halides to produce $H_2$ and halogen, coupled with a fuel cell mode to recombine hydrogen and halogen to produce electricity while making hydrogen-halide solution again. During off peak periods with low electric cost, the hydrogen-halide solution is electrolyzed to make hydrogen and free halogen which is stored as the liquid. Later, when it is desired to deliver additional power to the utility grid, the hydrogen and halogen are recombined electrochemically in the fuel cell.

It is disclosed in the above-referenced patent that it is possible to convert halogen back to hydrogen halide without using either hydrogen or fossil fuel. Accordingly, the apparatus just described can also serve for the net manufacture of $H_2$ gas for captive use or for the commercial market. Thus, for each mole of a halogen $X_2$ converted to HX, one mole of $H_2$ is available. The above-referenced patent discloses a high-temperature solar reactor for this purpose, utilizing a chemical reaction of $X_2$ with steam to yield HX and oxygen. The above-referenced patent discloses the use of HCl, $H_2$, and $Cl_2$ in the preferred embodiment. In that case, the desired chemical reaction $$Cl_2 + H_2O2 \rightarrow HCl + O_2$$

occurs readily and rapidly at temperatures above about 600° C., giving yields of more than 85% HCl in one pass of the reactant feed stream through the solar reactor.

(The above-referenced patent also discloses a solar-assisted electrolysis method, in which the electrolyte during electrolysis includes $H^+$, $X^-$, and a metal halide complex in a lower oxidation state, for example $IrX_6^{3-}$. During electrolysis, $H_2$ is produced at the cathode, as usual in hydrogen production via electrolysis. At the anode, the metal halide complex in the lower oxidation state (for example $IrCl_6^{3-}$) is oxidized to the metal halide complex in a higher oxidation state (for example, $IrCl_6^{2-}$). Subsequently, in the presence of sunlight, the metal halide in the higher oxidation state, in the presence of halide ions and sunlight, reforms the metal halide complex in the lower oxidation state, for example $IrCl_6^{3-}$, while releasing free halogen. These aspects are applicable to the presently described modified procedures; they will not be discussed further.)

SUMMARY OF THE INVENTION

Although the combined hydrogen production-load leveling facility works well as a systems using $HCl/H_2/Cl_2$, there are reasons for alternatively considering systems based on $HBr/H_2/Br_2$. A significant reason for preferring the bromine-based system is found in the area of safety considerations. Although chlorine can be liquefied at room temperature under moderate pressure, chlorine is gaseous at one atmosphere and temperatures near 298° K. (25° C.). On the other hand, bromine is a liquid at room temperature and one atmosphere pressure, and does not boil until a temperature of 79° C. is reached. Accordingly, if a container of bromine liquid sustains a small rupture in the headspace region, loss of bromine occurs only at a rather slow rate, whereas loss of chlorine is relatively rapid and continuous, until the reservoir is depleted. In a real case, the necessary input of heat required to gasify could cause a time delay.

From the viewpoint of efficient use of electrical energy, a bromine-based system is at least as good as a corresponding chlorine-based system, and probably somewhat superior. In particular, the electrochemical cell potentials for the reactions, $$2Cl^- = Cl_2 + 2e^- \text{ and } 4OH^- = O_2 + 2H_2O. + 4e^-$$

are so similar that, in a practical case, the gas evolved from the anode may not be pure $Cl_2$, but rather a mixture of $Cl_2$ with some $O_2$. This is not desirable, since $O_2$ production represents an inefficiency in electric current utilization.

In the case of bromine, the electrolysis is essentially optimal; the efficiency is better, costs are lower, and the anode product is not admixed with $O_2$. There a trade-off in overall system efficiency, however, since the back reaction of halogen with steam is less efficient for bromine than for chlorine:

$$X_2 + H_2O = 2HX + \tfrac{1}{2}O_2.$$

In the case of chlorine, the gas phase reaction of $Cl_2$ plus steam to give HCl and $O_2$ occurs readily at temperature near 600° C., giving yields as high as 85% or more in one pass. In contrast, the bromine/steam reaction shows rather small yields until the temperature is increase to 750°–800° C. or greater. Depending upon the bromine/steam ratio, yields in the range of 25–40% HBr are predicted by thermodynamic calculations for reactor temperatures of 900°–950° C. The laboratory staff of SRT, Inc., of Miami, Fla. 33233, have confirmed that the bromine-steam reaction works quite readily in practice. Yields of HBr of about 25% were achieved under typical conditions of a 4:1 excess of water over $Br_2$ and temperatures a little over 900° C.

In principle, relatively dilute HBr solutions can be brought to a higher concentration using fractional distillation. However, the system $HBr/H_2O$ constitutes a maximum boiling azeotropic mixture. When a solution more dilute than the azeotrope is distilled, nearly pure water can be removed at the still head, while the concentration of the residual mixture in the pot approaches that of the azeotrope. In case it is necessary to concentrate either spent electrolyte from the electrolysis cell or moderately concentrated HBr solution from the solar reactor (initially 25–40%), this can be achieved using distillation apparatus as described.

Concentration Versus Yield Considerations

In the conversion of halogen ($X_2$) plus steam to hydrogen halide (HX) plus oxygen, it is expected theoretically and confirmed experimentally that the percent conversion of halogen to HX increases as temperature increases. At a fixed temperature there is a tradeoff in the following sense:

A given experiment can be run at a low mole percent halogen (for example 5 mole %) and a relatively high mole % water (for example, 95 mole %) yielding a relatively high percentage conversion of $X_2$ to HX. However, due to the excess water, the molar concentration of HX in the resulting aqueous solution is rather low. Alternatively, it is possible to carry out the procedure with a higher percent halogen (for example, 35 mole % chlorine or bromine) and a correspondingly lower mole percent water (in this example, 65 mole % water). Such an experiment results in a considerably lower percent conversion of the reactant halogen to HX, but a higher molar concentration of HX in the resulting aqueous HX solution which is produced. The case of the chlorine-steam system was described earlier in a publication by researchers from SRT, Inc. (A. K. Gupta, R. Z. Parker and R. J. Hanrahan, Int. Jour. Hydrogen Energy, Vol. 16, pp. 677–681, 1991). For that chemical system, this behavior is shown in Table 2 of that publication for 3 points at 563° K. with chlorine/steam flow rates in the ratios 8/25, 4/25, and 2/25, which gave experimental conversions to HCl solution of 20%, 24%, and 27% respectively. This behavior is not of major importance in the chlorine system, however, because it is unnecessary to work under conditions of low conversion to product. The Table 2, just mentioned, shows that conversions of 80% are readily achieved in the chlorine-steam system using a chlorine/water flow ratio of 4/25 at a temperature of 873° K. (ca. 600° C.).

The qualitative effect is similar but the quantitative extent of the effect is much more pronounced in the bromine-steam system, due to the much higher range of temperatures needed to get good yields in that system. Considering attached Table 1 of the present document, it will be seen that typical percent conversion of $Br_2$ to product HBr is 16% using 9.6 mole % $Br_2$ in water, but rises to 48% conversion using 0.7 mole % $Br_2$ in water.

TABLE 1

Thermal Bromine Conversion Data.

| T(K) | $\chi Br2$ | $Y_{exp}$ | $Y_{calc}$ | Reactant flow (mol/min) |
|---|---|---|---|---|
| 915 | 0.199 | 0.3% | 3.1% | 0.34 |
| 915 | 0.062 | 0.5 | 6.0 | 0.34 |
| 915 | 0.040 | 0.7 | 7.7 | 0.35 |
| 915 | 0.035 | 0.7 | 8.4 | 0.33 |
| 915 | 0.006 | 1.8 | 23.4 | 0.34 |
| 1015 | 0.118 | 1.6 | 8.4 | 0.35 |
| 1015 | 0.059 | 2.6 | 12.3 | 0.34 |
| 1015 | 0.033 | 3.8 | 17.0 | 0.32 |
| 1015 | 0.025 | 3.2 | 19.8 | 0.33 |
| 1015 | 0.009 | 6.5 | 34.1 | 0.34 |
| 1110 | 0.120 | 5.6 | 14.1 | 0.38 |
| 1110 | 0.096 | 6.3 | 15.9 | 0.35 |
| 1110 | 0.056 | 7.9 | 21.2 | 0.34 |
| 1110 | 0.055 | 10.2 | 21.4 | 0.35 |
| 1110 | 0.032 | 10.6 | 28.3 | 0.32 |
| 1200 | 0.096 | 16 | 23.5 | 0.41 |
| 1200 | 0.004 | 22 | 34.5 | 0.34 |
| 1200 | 0.031 | 27 | 40.4 | 0.38 |
| 1200 | 0.022 | 41 | 46.8 | 0.33 |
| 1200 | 0.007 | 48 | 68.8 | 0.36 |
| 1250 | 0.099 | 19 | 27.6 | 0.45 |
| 1250 | 0.052 | 27 | 37.4 | 0.45 |
| 1250 | 0.039 | 29 | 42.4 | 0.41 |
| 1250 | 0.024 | 35 | 47.9 | 0.40 |

T is mean reactor temperature,
$\chi Br2$ bromine mole fraction,
$Y_{exp}$ experimental bromine conversion,
$Y_{calc}$ calculated thermodynamic conversion, and the total reactant molar flow rate.

There are practical consequences of the wide range in the important percent conversion variable, increasing from well below 20% to nearly 50% under practical operating conditions, coupled with the corresponding decrease in the molar concentration of HBr in the resulting apparatus in different reactant concentration regimes. In particular, there are specific advantages to operating either in the regime of low percent bromine in the reactant mixture (high percent conversion efficiency) or alternatively, high percent bromine in the reactant mixture (low percent conversion of $Br_2$, but high concentration of HBr in the product). Relevant considerations in operating in each of these two modes are discussed below; the intermediate situation also is considered. In considering the following description it should be realized that the energy required for the halogen-steam reaction could be derived from solar energy using either an optically transparent reactor cell to admit the solar energy as light photons, or using an opaque reactor cell to use the solar energy as thermal energy only, or alternatively supplied by other means such as fossil fuel or nuclear energy, with associated cost factors in each case.

Operation of Solar Reactor at Low Bromine/Steam Ratio

Operation of the high temperature bromine-steam solar reactor at low bromine/steam ratio, as outlined above, is a circumstance which gives optimal overall conversion of reactant $Br_2$ to product aqueous HBr per pass through the reactor. In this case, since time, cost, and effort are required in concentrating the HBr solution produced by the solar reactor, it appeared desirable to find a way to utilize rather dilute HBr directly, rather than investing in the cost and effort involved in concentrating it. In this connection, it should be borne in mind that the HBr electrolyzer requires a rather concentrated HBr solution, typically 9 molar or greater, whereas a fuel cell based on the combination of $H_2$ plus $Br_2$ to yield HBr operates most efficiently at a lower HBr concentration, typically 1 to 2 molar. Furthermore, as the cell operates, the resulting electrochemical reaction causes the solution to become more concentrated. Accordingly, the invention provides an operating mode in which relatively dilute HBr solution, obtained directly from the high temperature solar reactor, is used directly as the electrolyte and as a carrier for dissolved bromine, in connection with an $H_2/Br_2$ fuel cell. This mode of operation is advantageous when the overall plant facility is being used primarily for utility load leveling, rather than for production of hydrogen gas for sale or use off-site. The reason is that, when extensive load leveling is being carried out, the fuel cell subsystems will run long enough to do the required concentration enhancement of the HBr electrolyte.

Operation of Solar Reactor at High Bromine/Steam Ratio

Under conditions of a high ratio of bromine to steam, the resulting solution is formed at a relatively high molar concentration of HBr, easily approaching a concentration of 9 molar required for direct use in an HBr electrolysis cell. Accordingly, this mode of operation is optimal when relatively little load leveling is being done, that is, when the productive effort of the facility is directed towards manufacture of $H_2$ gas.

To the extent that load leveling is a minor aspect in this instance, it becomes feasible to use an $H_2/O_2$ or $H_2/air$ fuel cell, which is well known in the art and commercially available. That is, this fuel cell is used in place of an $H_2/Br_2$ fuel cell, which would be preferable (due to its higher efficiency) in the case that extensive load-leveling is to be carried out. Use of the $H_2/O_2$ or $H_2/air$ fuel cell precludes use of the fuel cell operation for concomitant conversion of dilute HBr solution into concentrated aqueous HBr solution. However, when it is desired to use nearly the entire output of the HBr electrolyzer to produce saleable hydrogen, it is in consequence also necessary reconvert nearly all of the product Br$_2$ back to HBr. Under this circumstance of plant operation, there is little need (or at best occasional need) to run the fuel cell, and therefore there is no reason to optimize HBr production to make dilute HBr solutions. However, physical phase separation of unreacted Br$_2$ from the HBr/H$_2$O solution phase, and recycling of the excess unconverted Br$_2$ back through the high temperature reactor, is important in this mode. Accordingly, there is a convenient synergistic situation, in which operation of a H$_2$/Br$_2$ fuel both for load leveling and for increasing concentration of the aqueous HBr solution (produced by the solar reactor) is not wanted or needed.

Operation of Solar Reactor at Intermediate Bromine/Steam Ratio

In general, the advantages of running the high temperature solar reactor at intermediate concentration ratios of Br$_2$ compared to steam (for example, 10 to 15 mole % Br$_2$) are less clear cut. However, the possibility of operating at any concentration ratio over a broad range is useful in that it provides a means to control and tune the molar concentration of HBr in the product aqueous solution (or alternatively, the percent conversion per pass through the reactor) to fit other requirements of the overall process—as an example, the ratio of spent electrolyte from the HBr electrolysis unit versus the amount of solution derived from the solar reactor. Also, since reactor yield increases with temperature and, therefore, with the quality of sunlight available to the solar reactor, it is possible within limits to compensate for the occurrence of hazy versus full sun. That is, if the reactor is receiving only hazy sunlight, resulting in a lower operating temperature, the mole ratio of Br$_2$ can be increased so as to increase the HBr molar concentration in the product solution.

Design of Solar Reactor

For use with the H$_2$/Cl$_2$/HCl chemical system as the preferred embodiment of the method described in U.S. Pat. No. 5,219,671, demands on the solar reactor are not severe, since the required operating temperature is relatively low, typically 600°–650° C. In the case of the H$_2$/Br$_2$/HBr system, operating temperatures of 900°–950° C. are appropriate. For optimal operation, the present invention provides a reactor design which allows for preheating the inflowing gas to the solar reactor while simultaneously partially cooling the outflowing gases to quench the reaction equilibrium in a condition characteristic of the high operating temperature. The present invention provides for optimal use both of the lower visible wavelength range of the incoming sunlight (500 nm down to 400 nm and below) plus the near UV radiation (400 nm down to the solar cutoff at earth's surface, near 300 nm), while also utilizing higher visible as well as infrared solar radiation. Several designs have been developed.

Addition of Methane to Enhance HBr Yields

Although U.S. Pat. No. 5,219,671 is directed at load leveling, hydrogen production or both, the process and apparatus it discloses was designed to be optimal, for instances where both utility load leveling and H$_2$ production were desired. More recently, work of the SRT, Inc. research group has been directed at hydrogen production as a primary goal, with lesser emphasis placed on load leveling. In this case, it is not permissible to assume that the electrolysis, chemical handling, purification, and storage facilities will have been installed and cost-justified for utility load leveling.

It is desired that an H$_2$ production system be economically viable in its own right. It is also desirable that a duty-cycle approaching 100% be achieved if needed, suggesting the use of a conventional furnace for the halogen-steam reaction, rather than a solar-driven furnace. However, to minimize use of fossil fuel and maximize efficiency, it is desired that the requirement of an input of thermal energy to overcome an unfavorable (endothermic) enthalpy of reaction to form HX be as little as possible; an exothermic formation reaction would be best. Use of added methane (or other hydrocarbon gas or vapor) leads to a system which fulfills the stated requirements.

Older literature describes enhancing the yield of the bromine/steam system by adding a source of carbon, such as charcoal:

$$Br_2+H_2O+C=2HBr+CO(\text{or } CO_2 \text{ in some cases})$$

The product carbon oxide can be either CO or CO$_2$, depending on the temperature other conditions. Relevant experiments were described by B. Neumann, W. Steuer, and R. Domke, Zeit. Angew. Chem., 39, 374 1926 and by the Russian workers N. Bozhovskii and P. T. Danilchenko, Zhurnal Russkogo Fiziko-Khimiches-Kogo Obschchestva Pri Leningradskom Universitete 59, 851 (1927). Temperatures required for nearly complete conversion of Br$_2$ were generally in the range 400°–700° C.; iron oxide was reported to serve as a catalyst. The topic was examined slightly later by I. M. Kolthoff, Rec. Travaux Chim. Pays-Bas., 48, 291 (1929), and A. S. Berhman received a related U.S. Pat. No. 1,870,308, "Manufacture of Hydrobromic Acid", issued Aug. 9, 1932.

More recently, the team of A. J. Darnell and W. E. Parkins of Rockwell International were issued U.S. Pat. No. 4,105,755 on Aug. 8, 1978 for a relatively low temperature (300° C.), high pressure (1000–1800 psi) batch process using coal, having a 15 min. residence time. Although their process for converting bromine to HBr was much different than that of the present invention, the product HBr was used to make H$_2$ via electrolysis. Darnell's group also published a report in the open document literature (SERI/STR-231–1875 dated December 1983) under the title "Production of Hydrogen from Renewable Resources". In these studies, bromine and water were reacted with biomass such as newsprint, wood, corncobs, feedlot waste, and sewage sludge.

When carbonaceous material is added to the bromine-steam reaction, formation of CO$_2$ is energetically very favorable, and adds to the overall driving force of the reaction. Advantage may be taken of this behavior in terms of higher percent yields of HBr product, lower operating temperatures, or both.

In practice, addition of carbonaceous matter is quite unnecessary for the chlorine/steam system-excellent yields, typically 80%, have been obtained at about 600° C., with no additives. However, addition of carbon-containing material appears to be much more promising in the case of bromine-based systems.

As a practical matter in running the reaction, carbon is somewhat inconvenient, due to the fact that it is a high melting, high boiling solid. It is not possible to run the reaction as a homogeneous gas phase process; a gas/powder technology would be required.

It is possible to use CH$_4$, C$_2$H$_6$, C$_3$H$_6$ or other low molecular weight hydrocarbon in place of carbon to promote the reaction. This provides carbon for the formation CO or CO$_2$, driving the reaction forward. In addition, it provides a second source for hydrogen required in the reaction. Using methane for example, This method does not convert $Br_2$ to HBr without use of fossil fuel, but it makes very frugal use of the fuel used, since much of the hydrogen content of the product HBr (and ultimately, of the hydrogen formed by electrolysis) still derives from water.

Depending on temperature and other operating conditions, other chemical products can be formed, including bromomethanes ($CH_3Br$, $CH_2Br_2$, $CHBr_3$, $CBr_4$) or even carbonyl bromide, $COBr_2$. However, formation of the halomethanes is not predicted in substantial amount based on their lower thermodynamic stability compared to HBr and CO or $CO_2$. Furthermore, although some $COBr_2$ may be formed as a transient species during the reaction, it is not expected as a final product in substantial amount, because it undergoes a known gas phase hydrolysis reaction with water, at moderate temperatures:

In the absence of additives, the bromine/steam reaction is optimally run at approximately 950° C. However, a lower operating temperature is achievable for the bromine/steam/methane system. Without added graphite or other carbon-containing material, rather high temperature is required to achieve a sufficiently high equilibrium constant in the forward direction of the reaction. With added carbonaceous material, the great chemical stability of CO and $CO_2$ serve to pull the equilibrium forward. Based on the cited references using charcoal, a moderately high temperature in the range 300° to 600° C. (600–900 K) is expected to be appropriate both for favorable equilibrium and adequate reaction rates. The lower temperature ranges will require a catalyst such as iron oxide or other transition metal oxide.

The addition of methane can easily be carried out, delivering initially high pressure methane through a reducing valve, to provide an operating pressure not much more than one atmosphere. Higher pressures can be utilized to improve throughput, but are not required to promote higher conversion to product, since the "delta n", that is the change of the number of moles of gases per mole of reaction occurring, is positive.

The methane is simply mixed with $H_2O$ and $Br_2$ prior to entering the reactor, and the entire mixture brought up to operating temperature. It is possible that external heat may need to be supplied to the reactor initially to achieve operating temperatures. However, startup could also be carried out by combusting methane (or another hydrocarbon) with added oxygen, then admixing $Br_2$ and $H_2O$ while cutting back on $O_2$ until stable operating conditions are reached. To the extent that external heat input is required, it can be conveniently supplied by electrical means, by external methane combustion or other convenient methods. However, due to bromine dissociation by absorbed light, it is expected that heating/activating by a solar light source will enhance the reactivity of the system greatly, also aiding in the destruction of any organobromine side-products. Due to the exothermicity of the reaction, however, relatively little additional heat will be required as the reaction runs and products are formed.

Treatment of products in the presence of methane is not complicated. The reaction mixture will be condensed, giving aqueous HBr, in which $Br_2$ is initially rather soluble. Surplus bromine can be removed from this mixture for recycling by distillation; the organics mentioned previously are relatively volatile, and will be removed with the excess bromine and redelivered to the bromine/steam/methane reactor. The entire mixture will reequilibrate on each pass through the oven. Therefore, the organics will not accumulate, but will merely reach a (rather low) steady state concentration.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION

Overall System Operation

The following three sections describe modes of operation of the overall electrolysis cell-solar reactor-fuel cell equipment for hydrogen production and utility load leveling; a further section describes the hydrocarbon-enhanced process. Note that heat energy is required by several steps in the process, especially in driving an azeotropic distillation for concentration of aqueous HBr solution. It is intended that the heat rejected in cooling down the output of the solar reactor (or conventional furnace) from about 900° C. to 100° C. be captured in a suitable heat exchange fluid (steam or a molten salt) and used for this purpose.

In all cases, $H_2$ gas is the major product of the process. Oxygen is a byproduct for the three solar-driven embodiments, while CO, $CO_2$ or a mixture of these gases is formed in the hydrocarbon-enhanced embodiment of the process. Stripper-dryer units (not shown or discussed further) preferably are provided before transfer of these gases to storage for later sale or use.

First Embodiment

System Using $H_2/Br_2$ Fuel Cell: Direct Use of Solar Reactor Output in $H_2/Br_2$ Fuel Cell.

Figure 1:
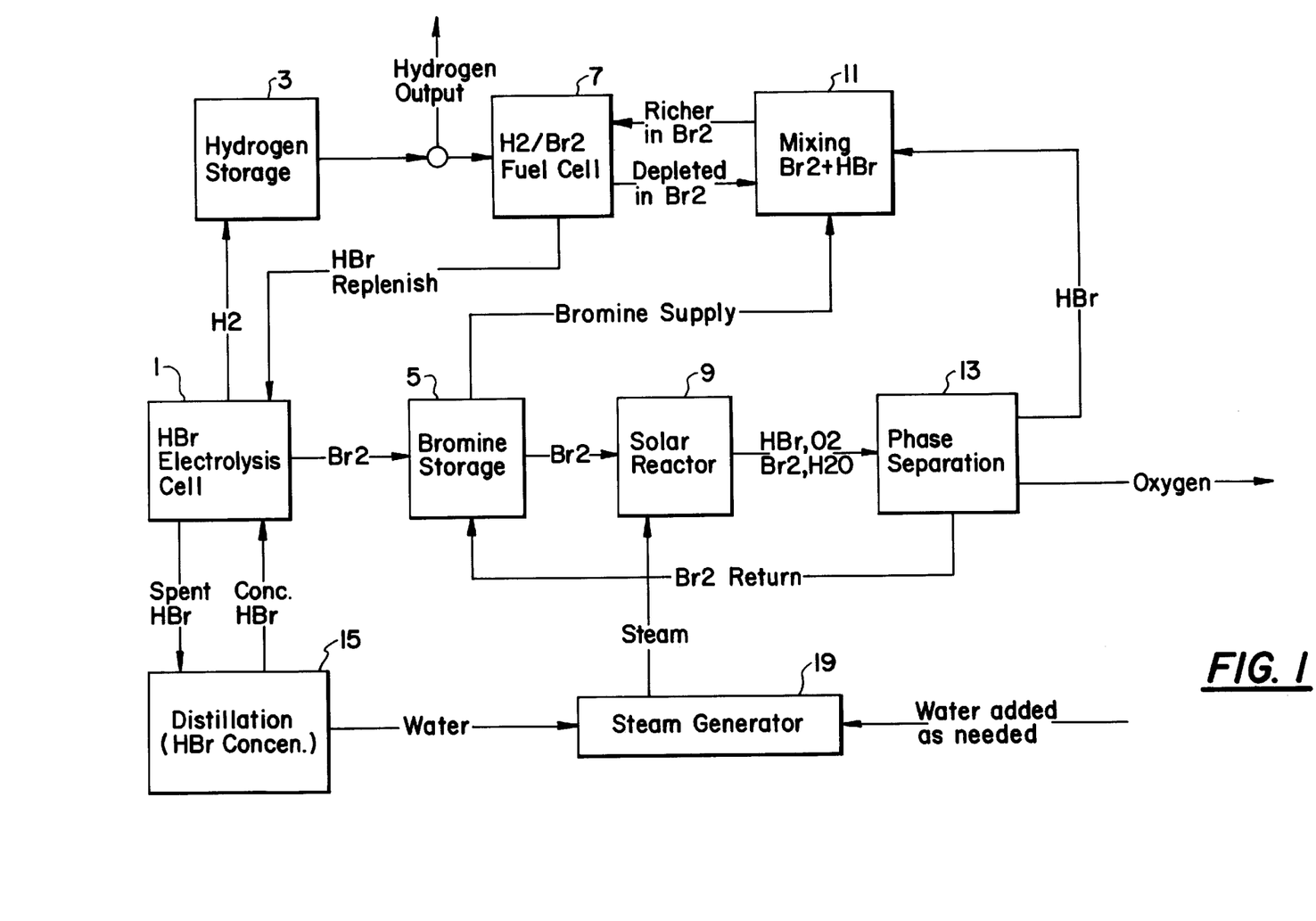
FIG. 1 depicts an arrangement of apparatus for performing a first embodiment of the method of the invention.

FIG. 1 depicts a typical arrangement of a system appropriate under the condition that the $Br_2/H_2O$ concentration ratio in the solar reactor, the reactor operating temperature, and/or the flow rates through the reactor are adjusted so as to achieve a concentration of the product HBr from the solar reactor as appropriate for direct use in the $H_2/Br_2$ fuel cell, numbered 7 in FIG. 1. Also, the relative times of operation of the fuel cell versus the electrolysis cell require matching. This situation occurs when there is sufficient $H_2$ in inventory for immediate needs, also assuming that electrical load leveling is called for. (When little or no load leveling is being done, operation in the second or third embodiments, described below, is appropriate.) The advantage of the first embodiment is a relatively small amount of separator work to be done in the azeotropic distillation/concentration control unit 15, as will be described below.

In the electrolysis cell 1, moderately concentrated HBr aqueous solution (typically 9 molar HBr) is electrolyzed to form $H_2$ gas and bromine (liquid or vapor). The hydrogen is directed towards storage vessel 3, where it is stored preferably as a metal hydride. Bromine is condensed and stored as a liquid in vessel 5. When conversion of $Br_2$ to HBr is required (so that $H_2$ is available for sale), bromine is transferred to solar reactor 9 where bromine plus steam produce HBr plus $O_2$; the output from the reactor, consisting of HBr and $O_2$ along with leftover reactants $Br_2$ plus steam, is directed to a phase-separation apparatus 13 (a gas stripper plus liquid density device such as a separatory funnel), whereby oxygen gas is released for cleanup and disposition/sale as desired; the heavy liquid bromine (containing a small amount of dissolved $H_2O$ and HBr, which can be tolerated) is returned to storage vessel 5.

The resulting aqueous HBr solution (which is adjusted to be approximately 2 molar HBr by control of solar reactor conditions as already described) is directed to the $Br_2$ saturation unit 11, where bromine from storage unit 5 is added. Aqueous HBr saturated with $Br_2$ is delivered to the cathode of the fuel cell, and $H_2$ from storage vessel 3 is delivered to the anode, producing electricity as required for utility load leveling. HBr solution is constantly circulated between $Br_2$ mixing device 11 and the cathode compartment of fuel cell 7 to maintain the desired $Br_2$ concentration at the cathode of fuel cell 7, as the chemical reaction uses up bromine.

The HBr electrolyte concentration of cell 7 continually increases; $H^+$ is formed at the anode by the cell reaction. The cell is preferably operated with an anion exchange membrane so that the overall aqueous HBr concentration in the anode chamber increases. This more concentrated HBr solution is then used to replenish the electrolyte concentration of electrolysis cell 1. A simple version of an azeotropic distillation apparatus may be connected to cell 1 to remove water (taken off at the still head, with the fluid from the pot recirculated to cell 1) as necessary to prevent water build-up in the electrolysis cell. The water so produced can be used in steam generator 19. Only a small amount of additional of water is needed in steam generator unit 19 to make up for conversion of $H_2O$ into $H_2$ and $O_2$.

Second Embodiment

System Using $H_2/Br_2$ Fuel Cell: Adjustment of Aqueous HBr Concentration Prior to Use in $H_2/Br_2$ Fuel Cell.

Figure 2:
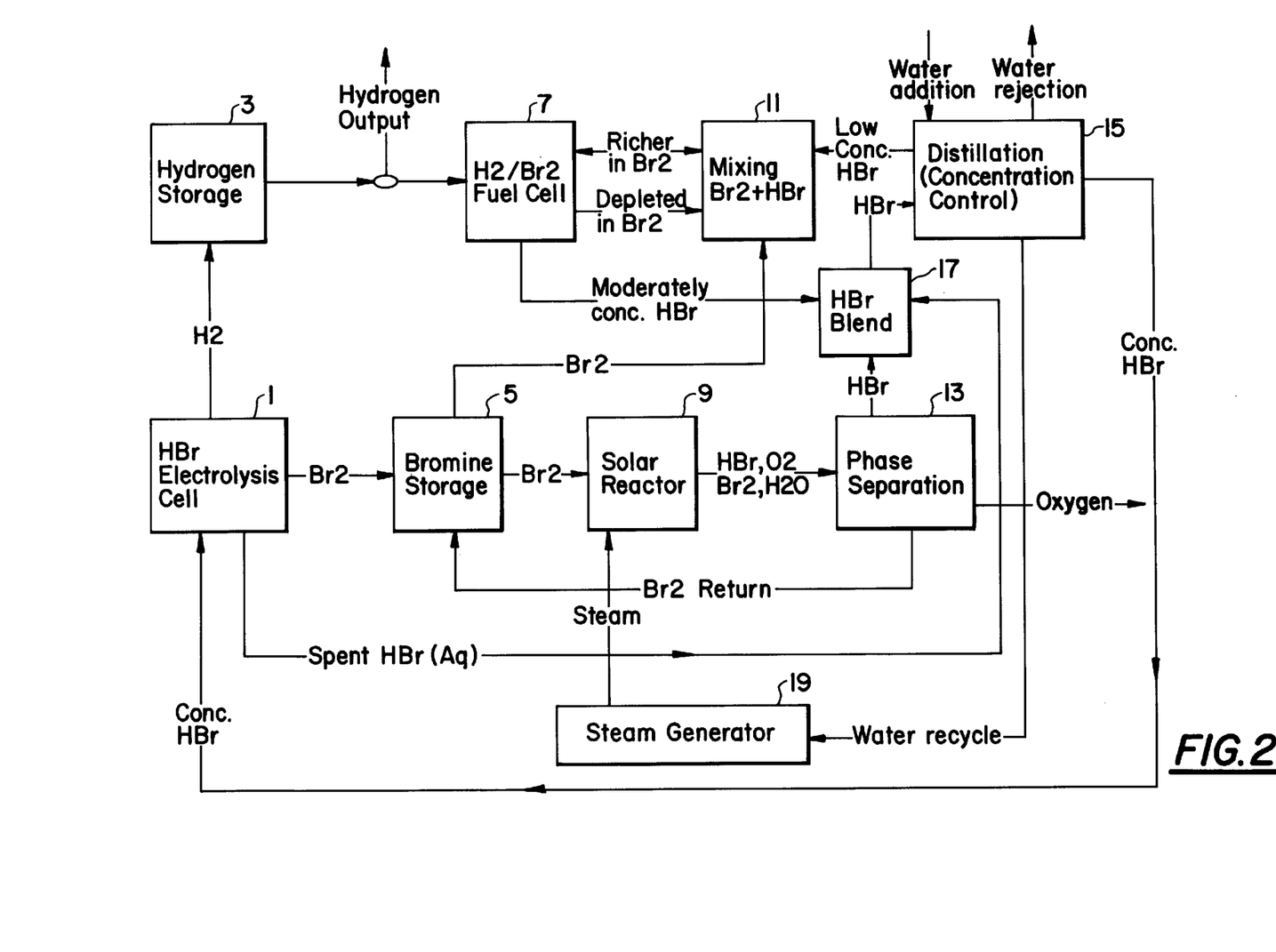
FIG. 2 depicts an arrangement of apparatus for performing a second embodiment of the method of the invention.

FIG. 2 depicts a typical arrangement of the system usable at any $Br_2/H_2O$ concentration ratio in the solar reactor, and at any concentration of the product HBr from the solar reactor. In this mode it is not necessary to adjust output of the solar reactor to achieve the HBr concentration needed in the fuel cell, since this is adjusted as needed. Also, the relative times of operation of the fuel cell versus the electrolysis cell do not require matching. In fact, if no load leveling is being done (all effort being devoted to manufacturing hydrogen), the fuel cell need not be operated at all. The trade-off is a greater amount of separatory work to be done in the azeotropic distillation/concentration control unit 15, as will be described below.

In the electrolysis cell 1 of FIG. 2, moderately concentrated HBr aqueous solution (typically 9 molar HBr is electrolyzed to form $H_2$ gas and bromine (liquid or vapor). The hydrogen is directed towards storage vessel 3, where it is stored preferably as a metal hydride. Bromine is stored as a liquid in vessel 5. When conversion of $Br_2$ to HBr is required (so that $H_2$ is available for sale), bromine is transferred to solar reactor 9 where bromine plus steam produce HBr plus $O_2$; the output from the reactor, consisting of HBr and $O_2$ along with leftover reactants $Br_2$ plus steam, is directed to a phase-separation apparatus 13 (a gas stripper plus liquid density device such as a separatory funnel), whereby oxygen gas is released for cleanup and disposition/sale as desired; the heavy liquid bromine (containing a small amount of dissolved $H_2O$ and HBr which can be tolerated) is returned to storage vessel 5.

The remaining aqueous HBr solution (which may be from 4 to 40 mole % HBr) is directed to a liquid mixing chamber 17, where it is combined with spent HBr solution from the electrolyzer (lower in concentration than optimally required for efficient electrolysis operation) plus spent HBr solution from the fuel cell (more concentrated than desired for best operation). This blended solution is sent to concentration control device 15, including a still with take-off points in the pot (most concentrated), at several intermediate points in the column (intermediate concentrations) and at the still head. This equipment will normally operate at an HBr concentration more dilute than the $H_2O/Br_2$ azeotrope. The pot concentration will approximate the azeotrope; almost pure water will be delivered at the still head.

A solution concentration optimal for use in the fuel cell can be taken off at any of the several intermediate take-off points. Also, the output from the HBr solution blender unit 17 can be delivered to an intermediate point of the column where the equilibrium concentration is near that of the input mixture. In the case that this is close to that required for the fuel cell, very little work of separation/concentration needs to be invested. Actually, units 15 and 17 may be combined, so that each feed (shown as going to device 17) can be delivered to a point in the distillation column where the concentration is nearly the same as the input, avoiding any unnecessary concentration work.

Low concentration aqueous HBr solution from device 15 is delivered to the $Br_2$ saturation unit 11, where bromine from storage unit 5 is added. Aqueous HBr saturated with $Br_2$ is delivered to the cathode of the fuel cell, and $H_2$ from storage vessel 3 is delivered to the anode, producing electricity as required for utility load leveling.

The water from the still head of device 15 is vaporized in boiler 19 and used in the solar reactor 9. Only a small addition of water is needed (combined with the effluent from 15) to make up for conversion of $H_2O$ into $H_2$ and $O_2$.

In practice, the apparatus for the first embodiment, described above, can be identical to the more general apparatus needed for the second embodiment; only the conditions of operation need be different, with the output of the solar reactor adjusted to be optimal for use in the fuel cell, with little or no separatory work/energy needed for adjustment of concentration at that stage, and with much of the concentration enhancement needed to refresh the electrolyte of the electrolysis cell taking place in the fuel cell as a bonus.

Third Embodiment

System Using $H_2/O_2$ Fuel Cell: Total Conversion of $Br_2$ to Aqueous HBr for reuse in Electrolysis Cell.

Figure 3:
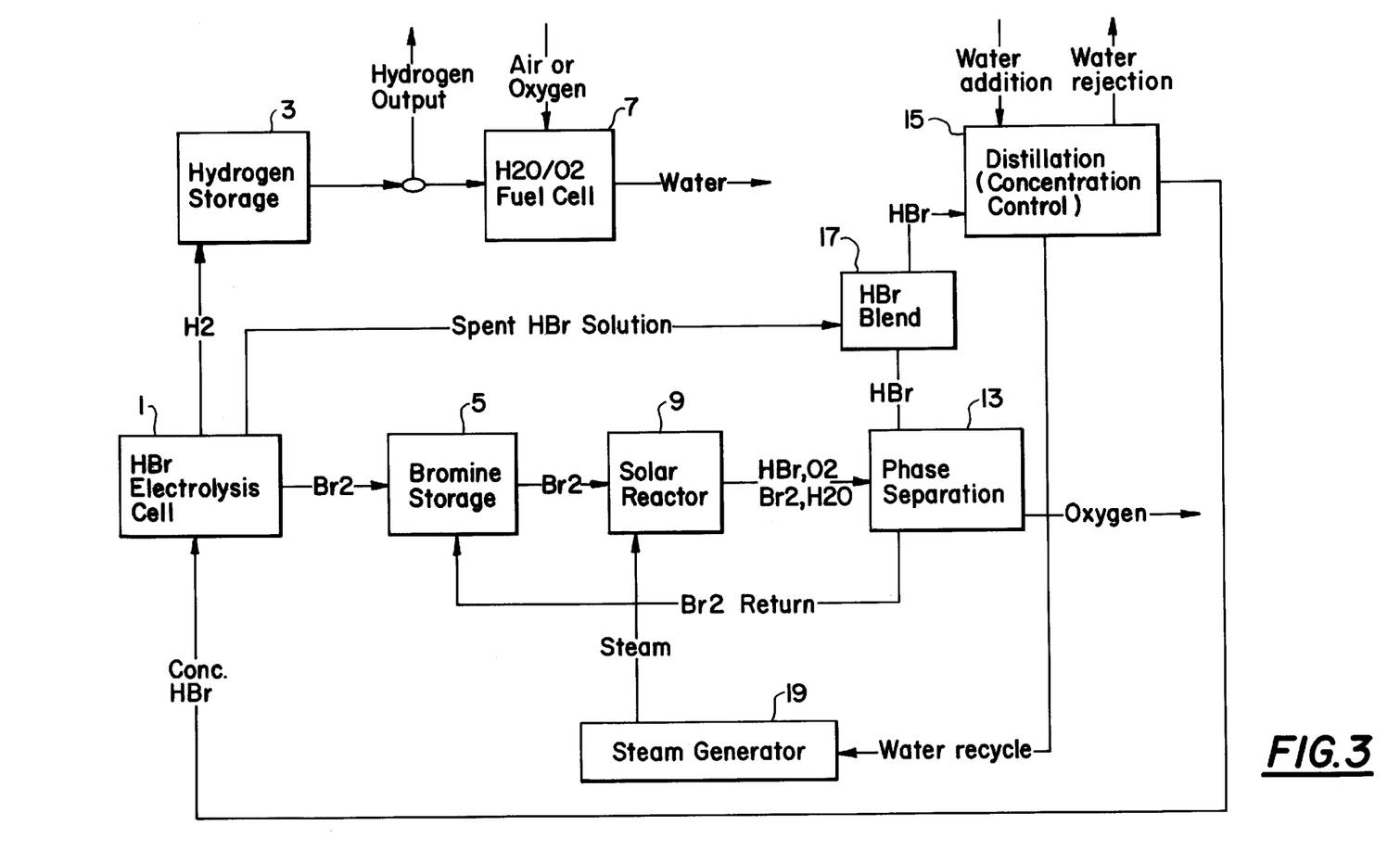
FIG. 3 depicts an arrangement of apparatus for performing a third embodiment of the method of the invention.

FIG. 3 depicts a typical arrangement of the system in the special case that a $H_2/O_2$ fuel cell is used when load-leveling is required. In this embodiment, it is necessary to recycle $Br_2$ and steam to the solar reactor to achieve complete conversion of bromine to HBr. This must be an aqueous solution at a concentration needed in the electrolysis cell. The relative times of operation of the fuel cell versus the electrolysis cell do not require matching, since any desired portion of the $H_2$ output can be used for load leveling, with the remainder being sold. In fact, if no load leveling is being done (all effort devoted to manufacturing hydrogen), the fuel cell need not be operated at all. The tradeoffs are the somewhat lower efficiency of a $H_2/O_2$ fuel cell versus an $H_2/Br_2$ unit, along with a rather large amount of separatory work to be done in the azeotropic distillation/concentration control unit 15, as will be described below.

In the electrolysis cell 1 of FIG. 3, moderately concentrated HBr aqueous solution (typically 9 molar HBr) is electrolyzed to form $H_2$ gas and bromine (liquid or vapor). The hydrogen is directed towards storage vessel 3, where it is stored preferably as a metal hydride. Bromine is stored as a liquid in vessel 5. Conversion of all product $Br_2$ to HBr is required since an $H_2/O_2$ fuel cell will be used. Therefore, bromine is transferred to solar reactor 9 where bromine plus steam produce HBr plus $O_2$; the output from the reactor, consisting of HBr and $O_2$ along with leftover reactants $Br_2$ plus steam, is directed to a phase separation apparatus 13 (a gas stripper plus liquid density device such as a separatory funnel), whereby oxygen gas is released for cleanup and disposition/sale as desired; the heavy liquid bromine (containing a small amount of dissolved $H_2O$ and HBr which can be tolerated) is returned to storage vessel 5, from whence it is continuously recirculated to the solar reactor and reseparated from the aqueous HBr solution, ultimately converting all the bromine formed in the electrolysis cell 1 into HBr solution.

The resulting aqueous HBr solution may be from 4 to 40 mole % HBr, but higher concentrations are desirable to minimize concentration work as described below. The HBr solution is directed to a liquid mixing chamber 17, where it is combined with spent HBr solution from the electrolyzer (lower in concentration than optimally required for efficient electrolysis operation). This blended solution is sent to concentration control device 15, including an azeotropic distillation unit with take-off points in the pot (most concentrated, for use in electrolysis cell) and at the still head. The pot concentration will approximate the azeotrope; almost pure water will be delivered at the still head. Units 15 and 17 may be combined, so that each feed (shown as going to device 17) can be delivered to a point in the distillation column where the concentration is nearly the same is the input, avoiding any unnecessary concentration work.

The water from the still head of device 15 is vaporized in boiler 19 and used in the solar reactor 9. Only small addition of water is needed (combined with the effluent from 15) to make up for conversion of $H_2O$ into $H_2$ and $O_2$.

Fourth Embodiment
Addition of Methane (or other hydrocarbon gas or vapor) to Enhance the Bromine-Steam Reaction.

Figure 4:
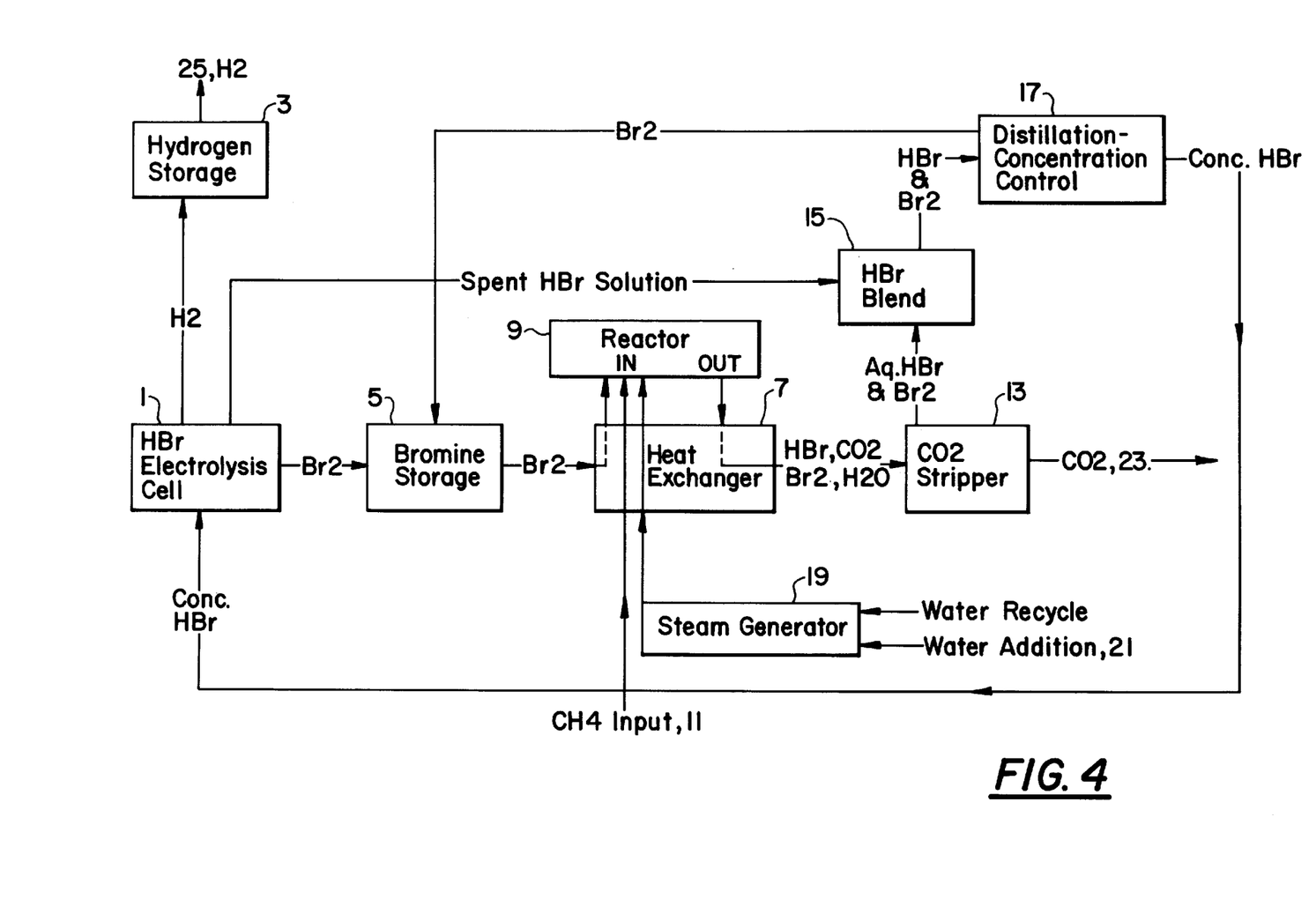
FIG. 4 depicts an arrangement of apparatus for performing a fourth embodiment of the method of the invention.

A preferred embodiment of a methane-assisted halogen-based system for $H_2$ production is discussed with respect to FIG. 4. The system includes of several major components including particularly the HBr electrolysis cell 1, the bromine-steam reactor 9, and the distillation/concentration control unit 17. Operations will now be described assuming the HBr electrolysis cell contains concentrated HBr electrolyte of the desired concentration. An electrical current is passed, preferably using inexpensive, off peak electric power, generating $H_2$ gas and bromine liquid, directed to storage containers 3 and 5 respectively. As may be convenient, the hydrogen is either cooled, compressed, and stored as a liquid, compressed and stored as a hydride, or stored as a gas. Bromine is routinely stored as a liquid, since it is easily liquefied.

The apparatus also includes a water recycling and steam generating system. Bromine from storage vessel 5, steam from generator 19, and methane from input port 11 are preheated by a heat exchanger 7 and directed into a reactor 9, which typically operates at 1–10 atm and 400°–800° C. In the presence of a suitable catalyst, typically consisting of a transition metal oxide, such as iron oxide, the reactants combine to form HBr and $CO_2$ (or possibly a mixture thereof containing some CO as well), along with some residual $H_2O$ and $Br_2$, all of which exit the reactor. Trace quantities of halomethane compounds such as $CH_3Br$, $CH_2Br_2$, or $CHBr_3$ may also be entrained, along with small amounts of carbonyl bromide, $COBr_2$. The output gas mixture from reactor 9 passes through the heat exchanger 7, to preheat the input gas stream as already described. The output gases are directed toward $CO_2$ stripper 13, where $CO_2$ (and CO if present) are released via exit port 23 for external storage and/or used as described below.

The remaining output from $CO_2$ stripper 13 consists of aqueous HBr plus $Br_2$ (along with traces of carbon/bromine compounds); this mixture is combined with spent HBr solution at 15, and the resulting solution is piped to the distillation/concentration control apparatus 17. The HBr concentration from reactor 9 is rather high, containing as much as 75–80% of the stoichiometric yield of HBr. Even after mixing with spent HBr from the electrolyzer, the aqueous HBr concentration may be nearly high enough for reuse in the electrolyzer cell 1. However, heating in the distillation apparatus 17 serves to selectively distill off $Br_2$, which is redirected to storage vessel 5, along with $H_2O$ which is returned to steam generator 19. Assuming that the mixture is on the low HBr side of the $H_2O$/HBr azeotrope, gaseous HBr is not released; concentrated HBr from the distillation of the azeotrope is recirculated back to HBr electrolyzer 1. (The SRT, Inc. research group has found that the $Br_2/H_2O/CH_4$ reaction is easily capable of making fuming HBr solution, on the high concentration side of the azeotrope, but admixture with spent HBr from the electrolysis unit is expected to drop the concentration to below the azeotrope.)

As can be seen, the only inputs to the system are methane at port 11 and additional makeup water as needed. The water can be added as convenient either at port 21, or in a second stage $CO_2$ stripper (from whence it is redirected to primary stripper 13) or to the distillation/concentration control unit if desired. The only outputs are hydrogen gas at output port 25 and a mixture of $CO_2$/CO at port 23. The output $CO_2$ at port 23, containing also some CO, depending upon operating conditions selected in reactor 9, is directed to external storage, for further use.

In many circumstances, an optimal use of the $H_2$ and $CO_2$ produced in this apparatus is to react them together forming methanol, a high-quality vehicle fuel, as described in U.S. Pat. No. 5,443,804. In this instance, admixture of some CO in the $CO_2$ product gas is an advantage rather than otherwise, because the first step in the $H_2/CO_2$ reaction to form methanol is catalytic reduction of $CO_2$ to CO, with an equivalent amount of $H_2$. For other uses, oxidation of the minor yield of CO to $CO_2$ can be carried out using catalysts known in the art.

Of the four common halogens, the flurine in HF is so strongly bonded that its electrolysis in cell 1 is not practical. The system can be run with HCl, but in that instance, addition of methane to reactor 9 is unnecessary, and operation according to U.S. Pat. No. 5,219,671, is preferred. Iodine is not sufficiently vigorous to react with $H_2O$ to a reasonable extent, so it is not preferred for use in this reactor. The method and apparatus works optimally for bromine, as described.

When beginning from a cold start-up, a reaction initiation procedure is required with reactor 9. At first, the reactor is brought to temperature either using auxiliary electrical power, and/or using a methane/air combustion. When operating temperatures have been reached, the inflow of air is shut off, while simultaneously introducing the bromine/steam mixture. Once initiated, the steady state operation can continue indefinitely.

Depending on conditions in the reactor, the system can be adjusted to produce maximum HBr, while leaving essentially no residue $CH_4$. There is typically a small amount of water, and a moderate amount of HBr, as well as $CO_2$ produced, along with some residual bromine reactant. However, in many circumstances, there are also small amounts of the halomethanes including $CH_3Br$, $CH_2Br_2$, and $CHBr_3$ as well as carbonyl bromide, $COBr_2$. It is not expected that, under preferred operating conditions more than 2 or 3% total of these substances will be produced. Since they are all considerably less volatile $H_2$ or $CO_2$, but also more volatile than water (except for $CHBr_3$), the small quantities of organics are carried back through the apparatus either in the water recycle line or the $Br_2$. These materials are then reintroduced to the reactor, where they simply participate in the reestablishment of equilibrium. According to standard thermodynamic principles, there is no reason to expect their accumulation.

The entire apparatus as described can be operated using the electric current directly in the electrolysis cell, as well as resistor heating wherever auxiliary heat is required. The auxiliary heat can also be provided using fossil fuels (especially methane/air combustion), solar energy, or nuclear energy as convenient. However, use of solar energy may be especially desirable, particularly in case that the selected operating condition of reactor 9 produces an inconveniently large amount of halomethanes. This is suggested because these compounds readily undergo decomposition with near-UV light, such as the light available in the short wavelength end of the solar spectrum.

As described above, it is possible to run the electrolysis equipment intermittently during periods of low electrical power costs, and storing bromine in container 5. Since the main electric power requirement is for operating the electrolysis cell, it is feasible to continue operating reactor 9 and other parts of the equipment during periods of high electricity costs. In some cases, either to simplify the equipment or avoid storage of a possibly hazardous material, it may be desired to eliminate the bromine storage facility. The equipment can also be operated in this mode with bromine from the electrolysis cell sent directly to reactor 9, but then it is likely optimal to operate the entire system mainly during off-peak power periods, cutting all systems back to a standby condition when electrical costs are high.

Another variation of the system (not shown) includes running the HBr electrolysis unit at an elevated pressure, for example 1500 psi, as is known in the art. This avoids the necessity of further compressing the product hydrogen gas; it can be stored conveniently and directly at 1500 psi. To facilitate this operating mode, a liquid compression pump can be installed in the concentrated HBr line between the distillation unit 17 and the electrolysis cell 1; also, pressure let-down valves are in that case installed in the $Br_2$ line and the spent HBr line exiting the electrolysis cell.

Solar Reactor

Figure 5A:
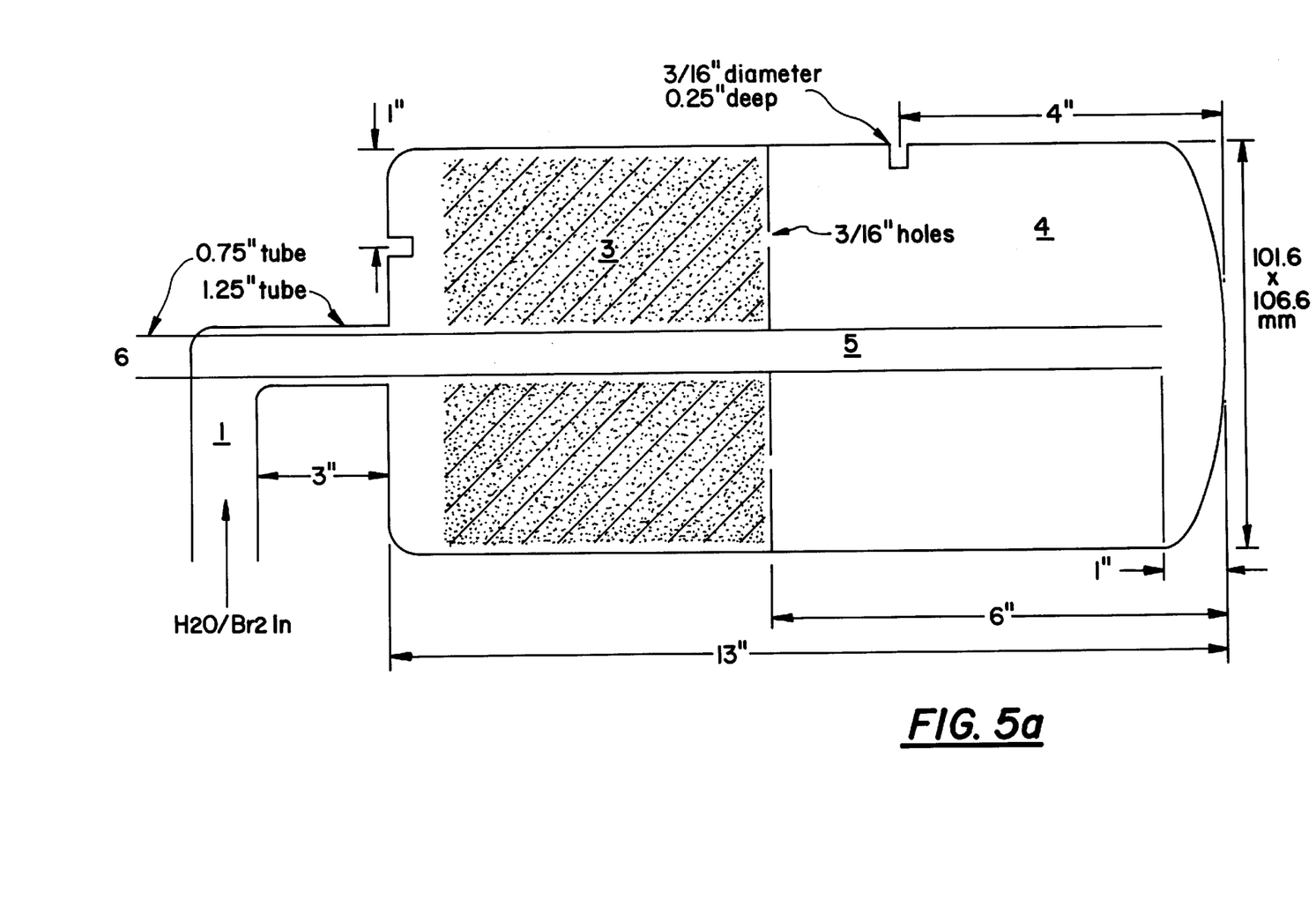
FIG. 5a is a schematic longitudinal sectional view of a solar reactor useful in practicing the method of the present invention.

A preferred embodiment of the solar reactor is shown in FIG. 5*a*. The $H_2O/Br_2$ reactant mixture enters through tubulation 1, coaxial with an effluent tube 6. Upon entering the reaction vessel, the mixture is dispersed through a porous, high-temperature packing such as reticulated silica, which is heated by a portion of the solar flux entering the reactor from the right. This high-temperature packing is held in place by a quartz plate, as shown, which has a multiplicity of ³⁄₁₆-inch holes which admit the gas to the main reactor region 4.

Region 4 is bathed in the full spectrum of sunlight, entering from a clear, high-quality quartz window on the right-hand end (as shown) of the approximately cylindrical reaction vessel. The portion of the spectrum absorbed in this space includes solar energy from the upper end of the visible absorption spectrum of bromine (approximately 540 nm) through the lower end of the visible at approximately 400 nm, and down to the UV cut-off of the spectrum at approximately 300 nm. Bromine absorbs light in this spectral region primarily by dissociation, as described in U.S. Pat. Nos. 4,848,087 and 5,247,796. The residual portion of the visible and infrared spectrum of sunlight is absorbed in the reticulated silica toward the left-end of the reactor vessel, where it is used to preheat the incoming gases.

The effluent gas is sampled from near the reactor face as shown, so that the composition will be characteristic of the highest temperature part of the reactor. Tube 5–6 passes through the region containing the inert porous packing, which serves to undergo rapid thermal equilibrium, dropping the temperature of the effluent gas very rapidly by about 100°–200° C.; this section of tubing may be zigzag or coiled to enhance heat transfer. The reactor effluent exits through tube 6; the output mixture consists of steam and HBr, plus residual $Br_2$ and $H_2O$. The residence time in region 4 can be varied according to flow-rates in the reactor volume, but residence times ranging from a few milliseconds to a few seconds are typical. As noticed, upon exit of the reactor region, the input and output tubes are concentric, to facilitate heat exchange. This concentric region can be extended from about three inches (as shown) up to several feet, as necessary, to achieve further quenching.

The product gases may still be at a temperature of about 400°–500° C. at the point where the input and output tube separate. Beyond that point, output tube 6 is jacketed to provide for further heat exchange with an appropriate heat-exchange medium, such as steam or molten salt. This heat exchange substance is used to provide process heat as required for the overall process (FIGS. 1–4), and especially to provide thermal energy for the azeotropic distillation apparatus.

Figure 5B:
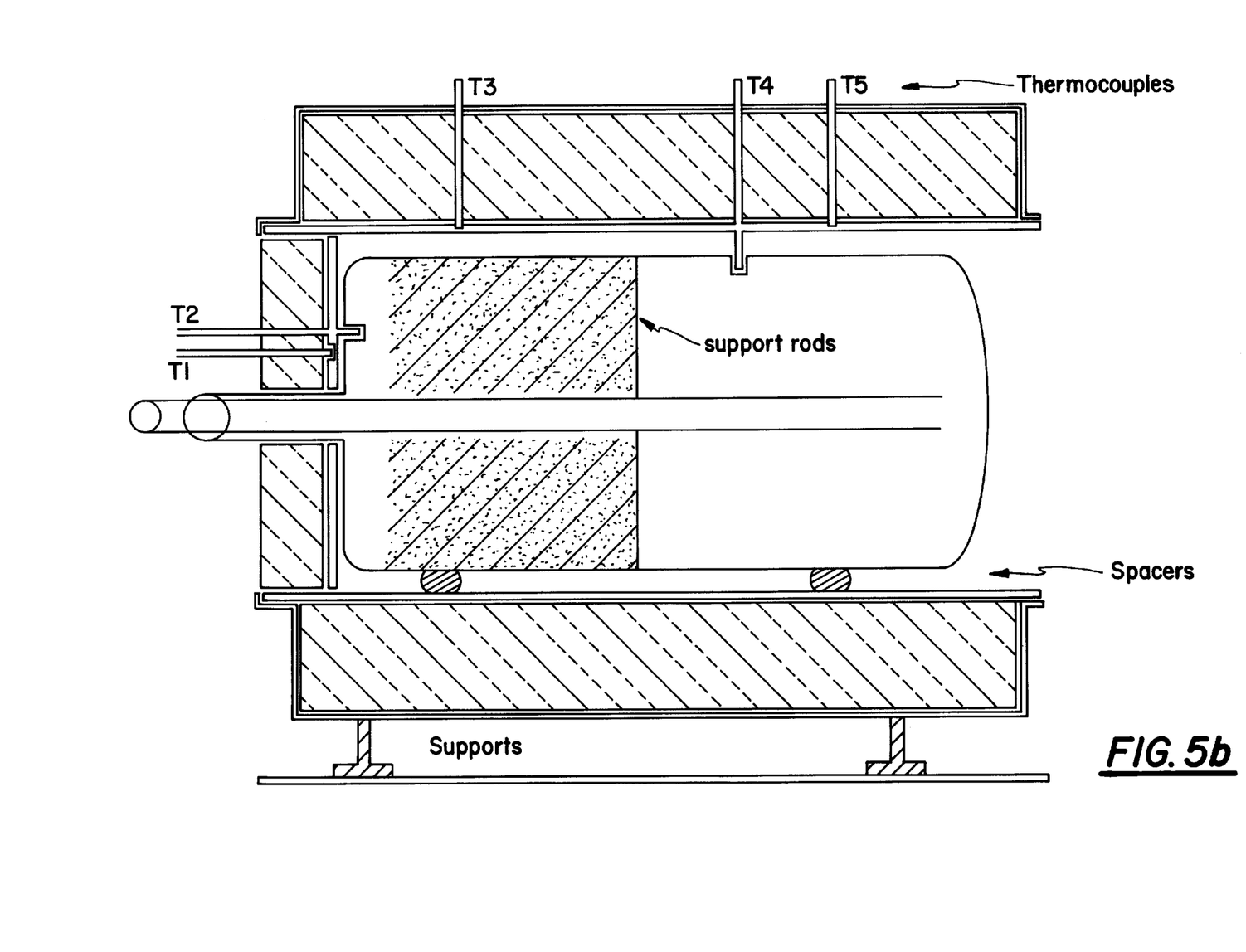
FIG. 5b is a schematic longitudinal sectional view, similar to FIG. 5a, but showing the solar reactor provided with a jacket of thermal insulation.

FIG. 5*b* shows the reactor with thermal insulation to aid in reaching the relatively high temperatures required. The reactor is held in place with spacers, as shown. Several thermocouples (T1 . . . T5) are shown in typical locations, for temperatures measurement.

Figure 6:
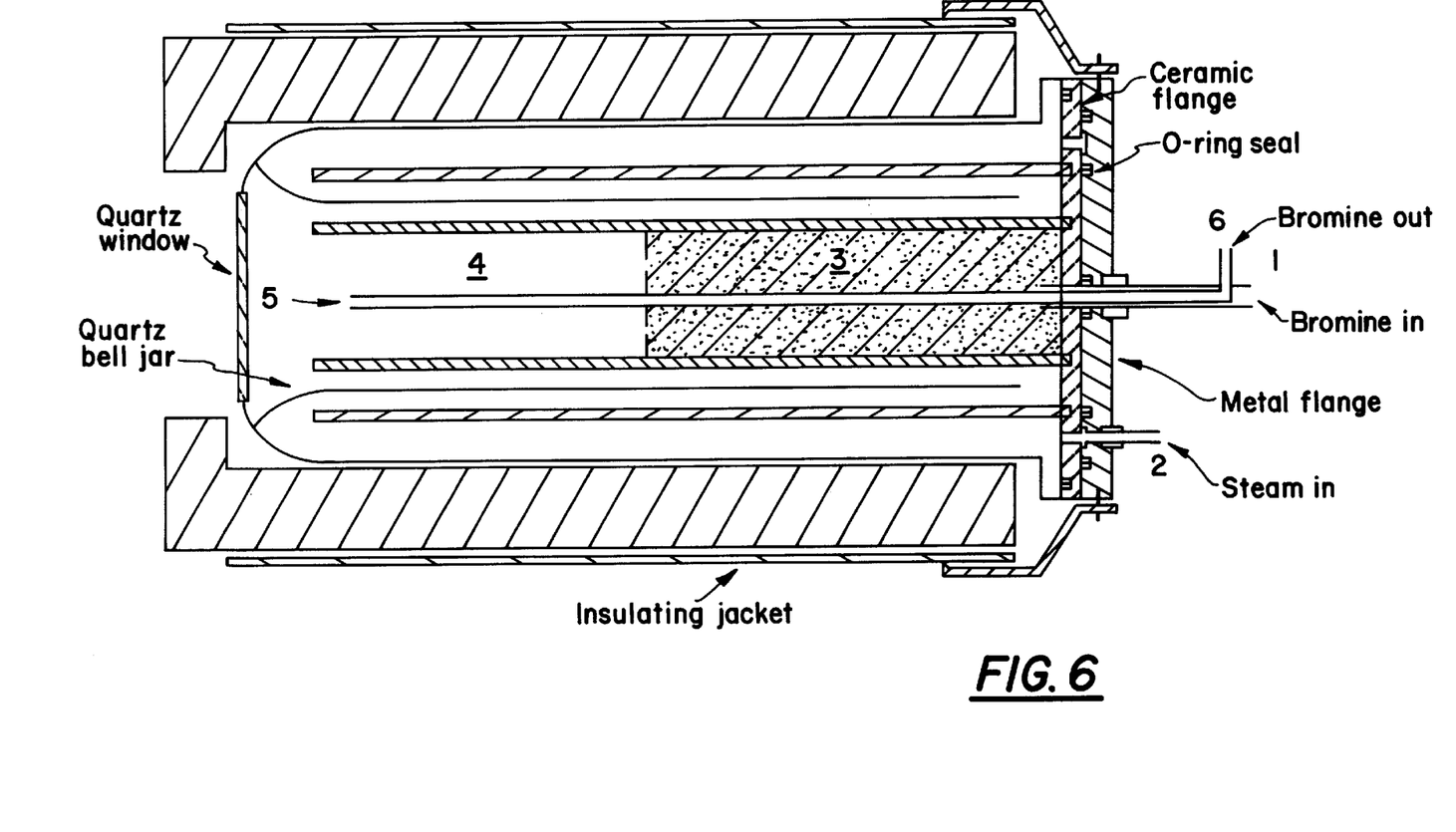
FIG. 6 is a schematic longitudinal sectional view of an alternate embodiment of a solar reactor useful in practicing the method of the present invention.

FIG. 6 is a design which differs in detail but serves a comparable purpose. It is shown with the solar window to the left. Note that the main enclosure is in the form of a quartz bell jar, but with an inner quartz cylinder attached by a ring-seal symmetric around the high-quality quartz window. All tubulations enter through the base, which consists of an outer plate of stainless steel or Monel metal, and an inner plate of Mullite, or comparable, machinable ceramic. The two plates are sealed gas/vacuum tight with two O-rings, as shown. An inner O-ring seals the coaxial input/ output tubes, which are quartz. Two additional concentric quartz tubes are inset into groves in the inner ceramic base. They can be held in place by ceramic cement, or by spacers. (Note that numbering is the same as FIG. 5a, except that this embodiment requires a separate steam input 2.)

Steam enters via a channel between the two base plates, connected to the outside by a tubulation 2, and to the inside by orifices in the ceramic base plate. The relatively cool entering steam maintains the large O-ring seal at the base of the bell jar relatively cool (less than about 250° C.), preventing thermal damage to the elastomer. The steam is preheated by the triple pathway required to reach the reaction zone. Bromine enters the outer concentric tube 1 and is dispersed in the reticulated quartz 3, quartz chips, or quartz wool used to pack about 50% of the inner chamber. A porous plate holds the packing in place; it can be held in place by a small "knob" on the inner tube. As in FIG. 5a, bromine and steam react in region 4, and exit via the inner concentric tube 5–6. Further aspects of heat exchange beyond the reactor exit are the same as in the embodiment shown in FIG. 5a.

We claim:

1. A method for generating hydrogen, comprising:
   (a) in an electrolysis cell having a cathode and an anode, electrolyzing an aqueous solution of HBr to form hydrogen, and bromine;
   (b) directing the hydrogen to a storage vessel;
   (c) condensing the bromine and storing the condensed bromine as a liquid;
   (d) when conversion of bromine to HBr is required, transferring the liquid bromine from storage to a solar reactor, and, in the solar reactor, contacting the liquid bromine with steam to produce HBr and $O_2$;
   (e) directing an output stream from the solar reactor, including the produced HBr and $O_2$, together with residual $Br_2$ and steam, to a phase separator and therein conducting a phase separation to separate from one another as respective streams $O_2$, aqueous HBr solution, and liquid bromine, containing some dissolved $H_2O$ and HBr;
   (f) saturating said aqueous HBr solution with the liquid bromine from storage in a saturation unit;
   (g) delivering the bromine-saturated HBr solution to the cathode of a fuel cell;
   (h) delivering hydrogen from said storage vessel to the anode of said fuel cell;
   (i) operating said fuel cell to produce electricity, increasing HBr electrolyte concentration in the fuel cell, and forming $H^+$ at the anode of the fuel cell;
   (j) continually circulating HBr solution between said saturation unit and said cathode of said fuel cell to maintain a desired bromine concentration at the cathode of said fuel cell;
   (k) while conducting step (a), removing water from the electrolyte to prevent build-up of water in the electrolysis cell; and
   (l) using some of the more concentrated HBr electrolyte produced in step (i) to replenish electrolyte concentration in said electrolysis cell.

2. A method for generating hydrogen, comprising:
   (a) in an electrolysis cell having a cathode and an anode, electrolyzing an aqueous solution of HBr to form hydrogen and bromine;
   (b) directing the hydrogen to a storage vessel;
   (c) condensing the bromine and storing the condensed bromine as a liquid;
   (d) when conversion of bromine to HBr is required, transferring the liquid bromine from storage to a solar reactor, and, in the solar reactor, contacting the liquid bromine with steam to produced HBr and $O_2$;
   (e) directing an output stream from the solar reactor, including the produced HBr and $O_2$, together with residual $Br_2$ and steam, to a phase separator and therein conducting a phase separation to separate from one another as respective streams $O_2$, aqueous HBr solution, and liquid bromine, containing some dissolved $H_2O$ and HBr;
   (f) directing the stream of the aqueous HBr solution to a liquid mixing chamber, and therein combining this aqueous HBr solution, with spent HBr solution from said electrolysis cell, which is lower in concentration of HBr than optimal for operation of said electrolysis cell, and with spent HBr solution from a fuel cell, which is higher in concentration of HBr than optimal for operation of said fuel cell, to produce a blended HBr solution;
   (g) sending said blended HBr solution to a concentration control device comprising a still having a plurality of take-off points for various concentrations, including a take-off point in the still head for nearly pure water;
   (h) delivering an aqueous HBr solution from a respective take-off point of said still, to a bromine saturation unit, and therein adding the liquid bromine stored in step (c) to produce a stream of bromine-saturated aqueous HBr solution;
   (i) delivering said stream of bromine-saturated aqueous HBr solution to the cathode of said fuel cell;
   (j) delivering $H_2$ from said storage vessel to the anode of said fuel cell; and
   (k) operating said fuel cell to produce electricity.

3. The method of claim 2, further comprising:
   vaporizing said almost pure water from the still head in a boiler to produce steam for use as said steam in said solar reactor.

4. A method for generating hydrogen, comprising:
   (a) in an electrolysis cell, electrolyzing an aqueous solution of HBr to form hydrogen and bromine;
   (b) directing the hydrogen to a storage vessel;
   (c) condensing the bromine and storing the condensed bromine as a liquid;
   (d) when conversion of bromine to HBr is required, transferring the liquid bromine from storage to a solar reactor, and, in the solar reactor, contacting the liquid bromine with steam to produced HBr and $O_2$;
   (e) directing an output stream from the solar reactor, including the produced HBr and $O_2$, together with residual $Br_2$ and steam, to a phase separator and therein conducting a phase separation to separate from one another as respective streams $O_2$, aqueous HBr solution, and liquid bromine, containing some dissolved $H_2O$ and HBr;
   (f) continuously recirculating the liquid bromine from said storage vessel to said solar reactor to convert substantially all of the liquid bromine formed in said electrolysis cell, into aqueous HBr solution by practice of steps (d) and (e);
   (g) directing the aqueous HBr solution from step (f), to a liquid mixing chamber, and therein combining this aqueous HBr solution with spent HBr solution from said electrolysis cell, which is lower in concentration of HBr than optimal for operation of said electrolysis cell, to produce a blended HBr solution; and (h) sending said blended HBr solution to a concentration control device comprising a still having a plurality of take-off points for various concentrations, including a take-off point in the still head for nearly pure water.

5. The method of claim 4, further comprising:

vaporizing said almost pure water from the still head in a boiler to produce steam for use as said steam in said solar reactor.

6. A method for generating hydrogen, comprising:

(a) in an electrolysis cell, electrolyzing an aqueous solution of HBr to form hydrogen and bromine;

(b) directing the hydrogen to a storage vessel;

(c) condensing the bromine and storing the condensed bromine as a liquid;

(d) operating a steam generator to generate steam;

(e) reacting the liquid bromine stored in step (c), with steam generated in step (d), and an input of methane, to form HBr and $CO_2$, with residual $H_2O$ and bromine, and trace quantities of bromomethane compounds, and a carbonyl bromide, as an output gas mixture;

(f) directing said output gas mixture to a $CO_2$ stripper and, therein, stripping $CO_2$ from the output gas mixture to provide a remaining output;

(g) combining said remaining output with spent HBr solution from said electrolysis cell, which is lower in concentration of HBr than optimal for operation of said electrolysis cell, to produce a blended HBr solution;

(h) sending said blended HBr solution to a concentration control device comprising a still having a plurality of take-off points for various concentrations, including a take-off point in the still head for nearly pure water;

(i) in said still, distilling off bromine and sending it to step (c); and distilling off water and sending it to said steam generator for use in producing the steam of step (d); and producing a stream of HBr; and (j) recirculating the stream of HBr from step (i), to the electrolysis cell, of step (a).

* * * * *